United States Patent
Chen

(10) Patent No.: US 12,044,565 B2
(45) Date of Patent: Jul. 23, 2024

(54) DEVICE AND METHOD FOR TOTAL CROSS-SECTION MEASUREMENT OF MASS FLOW RATE OF GAS, LIQUID AND SOLID IN MULTIPHASE FLOW

(71) Applicant: Sea Pioneers Technologies Co., Ltd., Wuxi (CN)

(72) Inventor: Jige Chen, Wuxi (CN)

(73) Assignee: SEA PIONEERS TECHNOLOGIES CO., LTD., Wuxi (CN)

( * ) Notice: Subject to any disclaimer, the term of this patent is extended or adjusted under 35 U.S.C. 154(b) by 268 days.

(21) Appl. No.: 17/361,451

(22) Filed: Jun. 29, 2021

(65) Prior Publication Data
US 2021/0325224 A1    Oct. 21, 2021

Related U.S. Application Data

(63) Continuation-in-part of application No. PCT/CN2019/080007, filed on Mar. 28, 2019.

(30) Foreign Application Priority Data

Dec. 29, 2018 (CN) .......................... 201811639591.1

(51) Int. Cl.
*G01F 7/00* (2006.01)
*G01F 1/88* (2006.01)

(52) U.S. Cl.
CPC ................ *G01F 7/005* (2013.01); *G01F 1/88* (2013.01)

(58) Field of Classification Search
CPC .................................... G01F 7/005; G01F 1/88
USPC ............................................................ 73/197
See application file for complete search history.

(56) References Cited

U.S. PATENT DOCUMENTS

| | | | |
|---|---|---|---|
| 2013/0319132 A1* | 12/2013 | Lupeau ...................... | G01F 1/36 378/54 |
| 2016/0076925 A1* | 3/2016 | Chen ......................... | G01F 1/74 702/49 |
| 2021/0293592 A1* | 9/2021 | Xie ........................... | G01F 1/74 |

FOREIGN PATENT DOCUMENTS

| WO | WO-2005057142 A1 * | 6/2005 | .............. G01F 1/58 |
|---|---|---|---|
| WO | WO-2017206199 A1 * | 12/2017 | .............. G01F 1/74 |

* cited by examiner

*Primary Examiner* — Alexander A Mercado
*Assistant Examiner* — Rodney T Frank
(74) *Attorney, Agent, or Firm* — MATTHIAS SCHOLL P.C.; Matthias Scholl

(57) ABSTRACT

A device for total cross-section measurement of a mass flow rate of gas, liquid and solid in a multiphase flow includes a gamma-ray source, a gamma-ray detector, and a differential pressure type flowmeter. The differential pressure type flowmeter includes a throat section, and the gamma-ray source and the gamma-ray detector are respectively disposed at opposite positions on both sides of the throat section. The gamma-ray detector is an array including a plurality of detection units, and the gamma-ray source is configured to emit gamma rays covering the measurement cross-section of the throat section. The gamma-ray detector is configured to receive the gamma rays passing through the measurement cross-section of the throat section.

7 Claims, 8 Drawing Sheets

DEVICE AND METHOD FOR TOTAL CROSS-SECTION MEASUREMENT OF MASS FLOW RATE OF GAS, LIQUID AND SOLID IN MULTIPHASE FLOW

CROSS-REFERENCE TO RELATED APPLICATIONS

This application is a continuation-in-part of International Patent Application No. PCT/CN2019/080007 with an international filing date of Mar. 28, 2019, designating the United States, now pending, and further claims foreign priority benefits to Chinese Patent Application No. 201811639591.1 filed Dec. 29, 2018. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of multiphase fluids, and more particularly to a device and a method for total cross-section measurement of a mass flow rate of gas, liquid and solid in a multiphase flow.

The phase refers to one of the distinct forms in which matter can exist with the same composition and the same physical and chemical properties in a system, and there is an obvious separable interface between the phases. Multiphase fluid is a common fluid form in the industrial production. It is composed of two or more phases with obvious interfaces, including gas/liquid, liquid/solid, gas/solid, liquid/liquid two-phase flow, as well as gas/liquid/liquid, gas/liquid/solid multiphase flow, etc. There are a large number of two-phase flow and multiphase flow measurement problems in industrial processes, life sciences, and nature, etc.

In the oil and gas industry, the products of oil-gas wells are gas-liquid-solid mixed fluids including liquid-phase crude oil, gas-phase natural gas, and solid-phase sands, which are called multiphase flow in the industry. The gas phase includes, for example, oil-gas field gas or any gas that does not condense at room temperature, specifically, such as methane, ethane, propane, butane, etc.; the liquid phase may include oil phase, for example, crude oil itself and liquid additives dissolved in the crude oil in the process of oil extraction, and water phase, for example, formation water, water injected into oil-gas wells during the use, and other liquid additives dissolved in the water phase; the solid phase includes solid matters such as sands, soils, and rocks mixed in the oil and gas exploitation. How to accurately measure the respective flow rates of gas, liquid, and solid in the mixed fluid produced from an oil-gas well in real time and accurate manner is the basic data necessary for oil and gas reservoir management and production optimization.

Flowmeters usually include volumetric flowmeters and mass flowmeters. The volume of fluid, especially gas, is a function of temperature and pressure and is a dependent variable, while the mass of fluid does not change with the changes in the temperature and pressure. Among the common flowmeters, such as orifice plate flowmeters, turbine flowmeters, vortex flowmeters, electromagnetic flowmeters, rotor flowmeters, ultrasonic flowmeters, and oval gear flowmeters, their flow measurement values are all volumetric flow rates of fluids. To be more precise, the amount of fluids involved in the activities such as scientific research, production process control, quality management, economic accounting, and trade transfer is generally expressed by the mass. Particularly, the pressure, temperature and composition of oil-gas well products are constantly changing with flow conditions. The mass flow rate can more accurately reflect the actual situation, and more rationally optimize the management and production of oil and gas reservoirs. However, the above volumetric flowmeters can be used to measure the volume flow rate of the fluids only, which often cannot meet the requirements, and it is usually necessary to obtain the fluid density to calculate the mass flow rate of the fluid. In this method, the volume flow rate is firstly calculated, and then the mass flow rate is calculated based on the fluid density, which requires many intermediate steps, so it is difficult to guarantee and improve the accuracy of the mass flow rate measurement.

In the related art, the most advanced method to simultaneously measure the respective volume flow rates of the three phases in a fluid is the gamma-ray measurement method. Its principle is to measure the total volume flow rate of the fluid using a venturi tube, and measure the respective phase fractions of three phases using a dual-energy gamma-ray detector, then the respective phase fractions are multiplied by the total volume flow rate to obtain the respective volume flow rates of the three phases, and then the respective operating density of the three phases is estimated, to convert into the respective mass flow rates of the three phases.

For the existing flowmeters using a gamma detector, the gamma detector comprises a gamma-ray transmitter and a gamma-ray receiver, wherein the gamma-ray transmitter generally uses a dual-energy gamma-ray transmitter. In practices, the common solution is that the source bin of the dual-energy gamma source is a composite structure composed of two $^{241}$Am sources. When two $^{241}$Am radiation sources are used, two 59.5 keV gamma rays are generated. One of the two gamma rays directly passes through the fluid as a high-energy gamma ray, and the other gamma ray bombards the target material made of silver, to excite the silver to emit low-energy gamma rays with an energy of 22 keV, and pass through the absorbing medium along the same path as the aforesaid high-energy gamma ray, and their transmission intensity is detected together by the gamma-ray detector. The dual-energy gamma rays are used to provide the information on the compositions of three phases inside the fluid. However, due to the differences in the material and geometric dimension of the silver targets, the initial intensities of the two gamma rays obtained in this way have no definite proportional relationship.

Multiphase flow is a multivariable random process, with the characteristics of temporal inhomogeneity and spatial inhomogeneity. The temporal inhomogeneity means that the fluid changes at any time when flowing in the pipe, so the flow rate measured at different times is varied. Regarding the temporal inhomogeneity, generally it can be solved by increasing the measurement frequency. The spatial inhomogeneity means that the three-phase distribution of the fluid is not homogeneous in the detected cross-section when the fluid flows through the gamma detector. If only one or a small amount of gamma rays pass through the cross-section for measurement, it is equivalent to sample and measure a small amount of paths, so the measured flow rate data are inaccurate.

At present, for the international mainstream multiphase flowmeters, phase fractions are measured based on gamma rays and the total flow rates are measured by a throttling flowmeter. The gamma detector adopts a conventional scheme, that is, a single scintillation crystal combined with a photomultiplier tube (PMT). For the measurement of fluid phase fractions based on a single radiation source and a detector, limited by the gamma-ray irradiation range and geometric size of the detector, samples can only be taken on local pipe cross-section for phase fraction measurement. For multi-phase flow with both temporal and spatial inhomogeneities, its measurement representativeness may produce a great error.

In the related art, a multiphase flow positron tomography device and method is disclosed. The device utilizes positron and negatron annihilation to generate a pair of compatible 511 keV energy γ-rays as a tomographic imaging method, providing on-line tomographic imaging for multiphase flow metering in oil pipelines. The device includes multiple sets of parallel high-precision gamma-ray detector arrays, positron emission sources and shields arranged in a specific spatial structure, which can obtain the phase fraction of multiphase flow mixtures such as oil, gas and water under the condition of a single radioactive source by combining with the image processing functions. The design of multiple sets of high-precision detector arrays greatly improves the accuracy of multiphase flow measurement and its applicability under different flow patterns of multiphase flow. The fluid image information it produces will greatly enrich the oil and gas measurement information in the oil and gas industry and provide basic data for more effective reservoir management and production optimization.

The design of positron emission sources is more complicated, and there are fewer positron emission sources that can be selected, and they are all with short half-lives, for example, the half-life of Na-22 is only more than two years, which is not suitable for long-term online detection of fluids in the industrial production process.

In addition, a single radioactive source cannot measure the total cross-section of the fluid. Instead, multiple sets of radioactive sources and detectors must be combined to achieve total cross-sectional measurement. However, there are many measurement data in this way. There are many rays passing through different angles in some parts of the cross-section, which requires a large amount of computation and consumes more time. Although the accuracy is high, only a ray passes through some parts on the cross-section, so the accuracy is relatively low and the accuracy of the phase fraction measured across the cross section is inconsistent. Moreover, a plurality of radioactive sources is disposed around the fluid pipes, and gamma rays will scatter and interfere with each other, resulting in inaccurate energy data and large errors in the final measured data.

SUMMARY

In one aspect, the disclosure provides a device for total cross-section measurement of mass flow rate of gas, liquid and solid in a multiphase flow, the device comprising a gamma-ray source, a gamma-ray detector, a differential pressure type flowmeter. The differential pressure type flowmeter comprises a throat section, and the gamma-ray source and the gamma-ray detector are respectively disposed at opposite positions on both sides of the throat section; the gamma-ray detector is in the form of an array comprising a plurality of detection units, and the gamma-ray source is configured to emit gamma rays covering a measurement cross-section of the throat section, and the gamma-ray detector is configured to receive the gamma rays passing through the measurement cross-section of the throat section.

The basic principle of the differential pressure type flowmeter is as follows. In a round pipe filled with fluid, throttling devices such as a venturi, an orifice plate or a nozzle are disposed, and the place with the smallest diameter is called a throat. When the fluid flows through the throttling device, a static pressure difference will be generated between its upstream and the throat. There is a fixed functional relationship between the static pressure difference and the flow rate. As long as the static pressure difference is measured, the flow rate can be obtained from the flow formula.

Through the above technical solution, the gamma-ray source and gamma-ray detector are arranged during mounting, such that the rays emitted from one gamma-ray source can fully cover the cross-section of the throat section of the differential pressure type flowmeter, and the rays can fully pass through the multiphase fluid flowing through the cross-section and are received by the gamma-ray detector on the other side of the differential pressure type flowmeter, and the total cross-section of the fluid is detected spatially. The spatial inhomogeneity of the fluid is solved properly to make the measured data more accurate than those measured when only part of the gamma rays passes through the cross-section. In this solution, only one radioactive source emits gamma rays, which will not generate interference and make the measured data more accurate. The array design of the gamma-ray detector expands the receiving range of the detector, ensuring that each gamma ray passing through the fluid is received.

In a class of this embodiment, the gamma-ray source is configured to emit gamma rays of at least three energy levels.

A multi-energy radiation source that can naturally emit gamma rays with more than three types of energy is used. Because the ratio of intensity of the naturally emitted gamma rays with three types of energy is inherent and constant that cannot be altered by humans and is not affected by any change in the external temperature and pressure, it brings great convenience and simplification to the solution of the flow formula of the disclosure. For example, using $^{133}$Ba, the gamma rays emitted by the radiation source have three main energy levels, 31 keV, 81 keV, and 356 keV respectively; or using $^{176}$Lu, the gamma rays emitted by the radiation source have at least three energy levels, namely, 307 keV, 202 keV, and 88 keV.

In a class of this embodiment, the gamma-ray source and the gamma-ray detector cooperate with each other to form a detection pair, and at least one detection pair is disposed along the axial direction of the differential pressure type flowmeter.

Thus, each detection pair is capability of performing total cross-section measurement of the phase fraction of the multiphase fluid, and the data measured by each detection pair can be averaged, to make the result more accurate.

In a class of this embodiment, when a plurality of detection pairs is disposed along the axial direction of the differential pressure type flowmeter, a distance between every two adjacent detection pairs is 1 to 10 cm.

Theoretically, the state of the multiphase fluid changes little in a short distance and a short period of time. Therefore, the closer the distance between the two detection pairs, the smaller the state change of the multiphase fluid, and the more accurate the measured data. Since the velocity of the fluid is generally 10 m/s, when the distance is set to 1 to 10 cm, the state of the multiphase fluid is almost unchanged within this distance, so that the data measured by each detection pair are considered to be from the same cross-section.

In a class of this embodiment, the plurality of detection pairs is staggered with each other along the axial direction of the differential pressure type flowmeter and distributed around the axial direction.

Since both the gamma-ray source and the gamma-ray detector have a certain volume, if all the detection pairs are disposed in the same position and the distance therebetween is too small, they will easily touch each other, and if the distance therebetween is too large, the measurement accuracy will decrease. Therefore, the detection pairs are staggered to make full use of the space for the layout of the gamma-ray source and the gamma-ray detector, which can ensure a short distance between the two detection pairs without interfering with each other and occupying space; and after staggering, adjacent gamma-ray sources emit gamma rays in different directions, which will not easily interfere with each other and will improve measurement accuracy.

In a class of this embodiment, the gamma-ray detector is in the form of an array comprising a plurality of detection units.

The detectors are disposed more closely in this way to be able to receive each of the rays without any omission and make the measurement more accurate. For example, in a square matrix, the number of detectors in each row and each column is the same, and there is no gap between adjacent detectors. The detectors are arranged in a square matrix, to easily calculate them. The number of detectors can be set according to the actual needs, for example, 4*4, 6*6, 8*8.

In a class of this embodiment, a scintillation crystal is connected to one end of each detection unit receiving gamma rays, and the detection unit is a silicon photomultiplier (SiPM).

Scintillation crystals, as a material often used in ray detection technology, are capable of converting high-energy gamma rays into low-energy visible light fluorescence, which are then detected by a silicon photomultiplier to convert into electrical signals. At present, commonly used scintillation crystals include sodium (thallium) iodide NaI (Tl), lutetium oxyorthosilicate (LSO), etc. A silicon photomultiplier (SiPM) is a novel detector. After photons are absorbed, a current is generated in the SiPM and multiplied, which can output a larger current signal and can be received by the modular circuit. Its detection efficiency of gamma rays is higher and its volume is smaller.

In a class of this embodiment, the scintillation crystal and the detection unit are fixed to each other by a couplant.

The scintillation crystal is a high-density crystal. The surface of the detector is provided with a layer of epoxy resin. When the light is emitted from the scintillation crystal to the detector, it is emitted from an optically denser medium to an optically thinner medium. If air exists between them, total reflection easily occurs, causing light loss. Optical couplants, especially optical couplers, are transparent media with large refractive index. When couplants are disposed between the scintillation crystal 22 and the detector, the air can be effectively eliminated and the light loss caused by total reflection can be significantly reduced. The couplant may be a silica gel to bond the scintillation crystal to the detector, effectively reducing the loss of light from the scintillation crystal to the detector and improving the photoelectric conversion efficiency.

In a class of this embodiment, the device further comprises a temperature and pressure sensor for measuring the temperature and pressure of the fluid and a differential pressure sensor for measuring the pressure difference between the inlet of the differential pressure type flowmeter and the throat section.

The disclosure further provides a method for total cross-section measurement of a mass flow rate of gas, liquid and solid in a multiphase flow using the aforesaid device, the method comprising:

a) measuring a temperature T of a multiphase liquid by a temperature sensor, measuring a pressure difference $\Delta P$ between an inlet of the differential pressure type flowmeter and the throat section; and measuring transmission intensities $N_{x1}$, $N_{x2}$, $N_{x3}$ of three gamma rays by the gamma-ray detector;

b) calculating the total mass flow rate of the multiphase fluid and the respective mass flow rates of the gas, liquid and solid phases of the multiphase fluid according to the following formula:

total mass flow rate:

$$Q_m = \frac{c}{\sqrt{1-\beta^4}} \varepsilon \frac{\pi}{4} D^2 \sqrt{\Delta P \rho_{mix}};$$

gas mass flow rate: $Q_{m,g}=Q_m*\text{GMF}$;

liquid mass flow rate: $Q_{m,l}=Q_m*\text{LMF}$;

solid mass flow rate: $Q_{m,s}=Q_m*\text{SMF}$;

where,
gas mass fraction, $$GMF = \frac{Q_g}{Q_g + Q_l + Q_s};$$

liquid mass fraction, $$LMF = \frac{Q_l}{Q_g + Q_l + Q_s};$$

solid mass fraction, $$SMF = \frac{Q_s}{Q_g + Q_l + Q_s};$$

where, $Q_g$, $Q_l$, $Q_s$ are respectively the linear masses of the gas, liquid, and solid phases, and $$Q_g = \theta - \frac{(k_2-1)(d_1-d_2)+(k_4-k_2)(d_1-\theta)}{(k_2-1)(k_1-k_3)+(k_4-k_2)(k_1-1)} - \frac{(k_3-1)(d_1-d_2)+(k_3-k_1)(d_1-\theta)}{(k_3-1)(k_2-k_4)+(k_3-k_1)(k_4-1)};$$

$$Q_l = \frac{(k_2-1)(d_1-d_2)+(k_4-k_2)(d_1-\theta)}{(k_2-1)(k_1-k_3)+(k_4-k_2)(k_1-1)};$$

$$Q_s = \frac{(k_3-1)(d_1-d_2)+(k_3-k_1)(d_1-\theta)}{(k_3-1)(k_2-k_4)+(k_3-k_1)(k_4-1)};$$

Where,

-continued $$\theta = \frac{\pi}{4}\left(\frac{c}{\sqrt{1-\beta^4}}\varepsilon D\right)^2 \Delta P \frac{t}{l};$$

$$k_1 = \frac{a_{l,1} - a_{l,2}}{a_{g,1} - a_{g,2}};$$

$$k_2 = \frac{a_{s,1} - a_{s,2}}{a_{g,1} - a_{g,2}};$$

$$d_1 = \frac{1}{a_{g,1} - a_{g,2}}\ln\left(\frac{f_1}{N_{x,2}}\right) - \ln(N_{x,1});$$

$$k_3 = \frac{a_{l,1} - a_{l,3}}{a_{g,1} - a_{g,3}};$$

$$k_4 = \frac{a_{s,1} - a_{s,3}}{a_{g,1} - a_{g,3}};$$

$$d_2 = \frac{1}{a_{g,1} - a_{g,3}}\ln\left(\frac{f_2}{N_{x,3}}\right) - \ln(N_{x,1});$$

the letters in each formula are defined as follows:

C: The discharge coefficient of the differential pressure type flowmeter;

ε: The multiphase fluid compression correction factor;

β: The diameter ratio of differential pressure type flowmeter;

D: The thickness measured by gamma rays, namely, the diameter of the fluid pipe;

ΔP: The pressure difference;

f1, f2: The initial intensity ratios of the second gamma ray and the third gamma ray to the first gamma ray;

$\rho_{mix}$: The average density of the measured fluid:

$$\rho_{mix} = (Q_g + Q_l + Q_s)/S\frac{t}{l};$$

S is the area of the measured cross-section $$S = \frac{\pi}{4}D^2,$$

is the unit length, and t is the unit time;

α is the mass absorption coefficient of the multiphase fluid for gamma rays, Q is the mass flow rate of the multiphase fluid to be measured, the subscripts 1, 2 and 3 respectively represent gamma rays of different energy levels;

Finally, all calculation results are weighted and averaged to obtain the final and accurate linear mass value of each phase according to the following formulas:

$$Q_g = \Sigma(Xi/D * Q_{gi})/\Sigma(Xi/D);$$

$$Q_l = \Sigma(Xi/D * Q_{li})/\Sigma(Xi/D);$$

$$Q_s = \Sigma(Xi/D * Q_{si})/\Sigma(Xi/D);$$

$Q_g$, $Q_l$, $Q_s$ are the final linear masses of gas, liquid and solid to be solved. D is the diameter of the throat section of the differential pressure type flowmeter, X is the distance passed by each gamma ray in the throat section, $Q_{gi}$, $Q_{li}$, $Q_{si}$ are the linear mass values measured after each gamma ray passes through the throat section; conduct statistics on all gamma rays and their linear mass data of each phase according to the formula, to calculate the final accurate values.

The following advantages are associated with the device and the method for total cross-section measurement of a mass flow rate of gas, liquid and solid in a multiphase flow of the disclosure: the total cross-section of the multiphase fluid is detected spatially. The spatial inhomogeneity of the fluid is solved properly to make the measured data more accurate than those measured when only part of the gamma rays passes through the cross-section (sampling measurement). There is no scattering interference between the radiation sources of the disclosure, so that the measured data are more accurate; the array design of the gamma-ray detector expands the receiving range of the detector, ensuring that each gamma ray passing through the multiphase fluid is received.

DETAILED DESCRIPTION

To further illustrate, embodiments detailing a device and a method for total cross-section measurement of a mass flow rate of gas, liquid and solid in a multiphase flow are described below. It should be noted that the following embodiments are intended to describe and not to limit the disclosure.

Example 1

Figure 1:
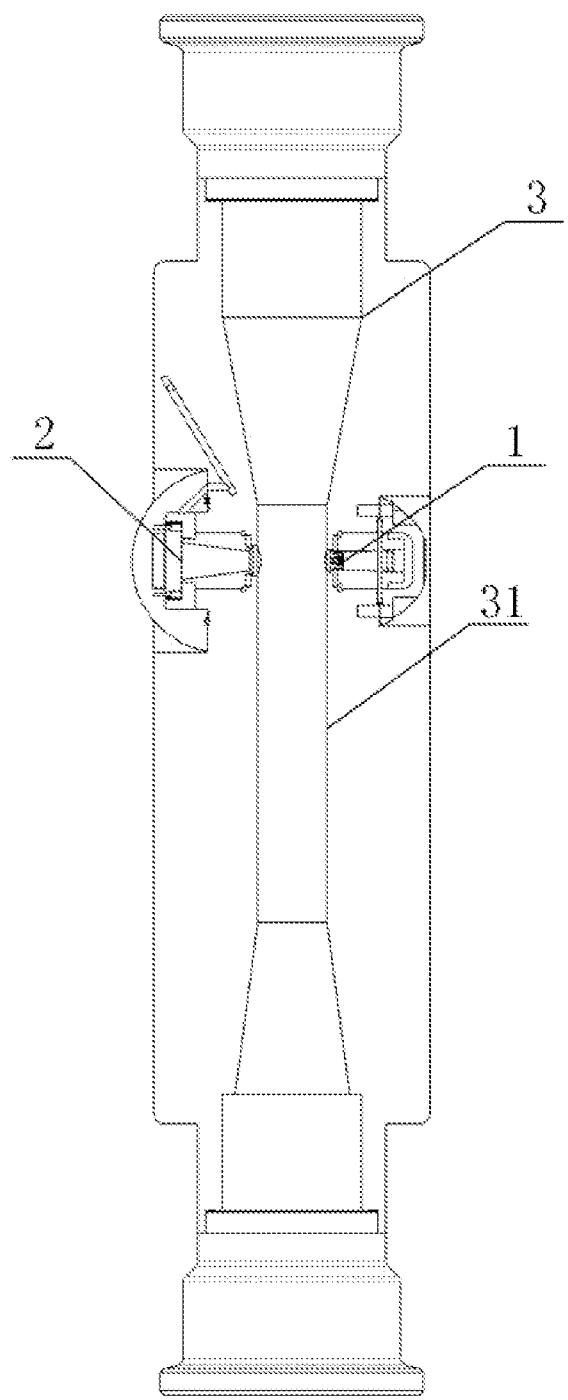
FIG. 1 is a schematic view of a device for total cross-section measurement of a mass flow rate of gas, liquid and solid in a multiphase flow of Example 1.

As shown in FIG. 1, a device for total cross-section measurement of mass flow rate of gas, liquid and solid in a multiphase flow comprises a gamma-ray source 1, a gamma-ray detector 2, and a differential pressure type flowmeter 3. The differential pressure type flowmeter 3 comprises a throat section 31, and the gamma-ray source 1 and the gamma-ray detector 2 are respectively disposed at opposite positions on both sides of the throat section 31; the device further comprises a temperature and pressure sensor for measuring the temperature and pressure of the multiphase fluid and a differential pressure sensor for measuring the pressure difference between the inlet of the differential pressure type flowmeter 3 and the throat section 31.

The basic principle of the differential pressure type flowmeter 3 is as follows. In a round pipe filled with fluid, throttling devices such as a venturi, an orifice plate or a nozzle are disposed, and the place with the smallest diameter is called a throat. When the multiphase fluid flows through the throttling device, a static pressure difference will be generated between its upstream and the throat. There is a fixed functional relationship between the static pressure difference and the flow rate. As long as the static pressure difference is measured, the flow rate can be obtained from the flow formula.

Figure 3:
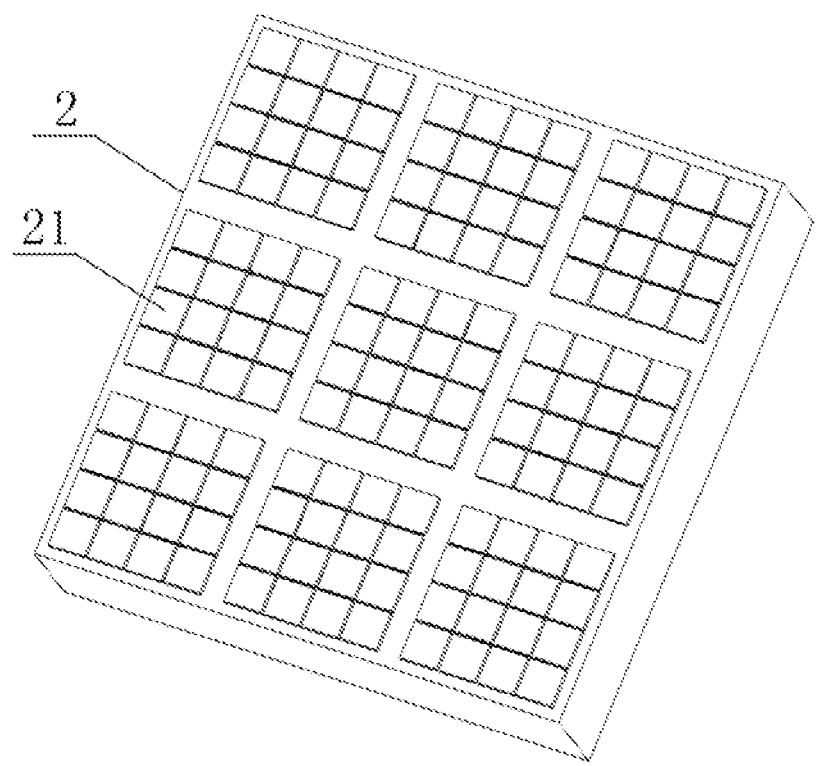
FIG. 3 is a schematic view of a gamma-ray detector in Example 1.

As shown in FIG. 3, the gamma-ray detector 2 is in the form of an array comprising a plurality of semiconductor detectors 21. In this example, the semiconductor detector 21 is SIPM. The gamma rays emitted by the gamma-ray source 1 cover the total cross-section where the throat section 31 is disposed, and all gamma rays passing through the cross-section where the throat section 31 is disposed can be received by the gamma-ray detector 2.

Figure 2:
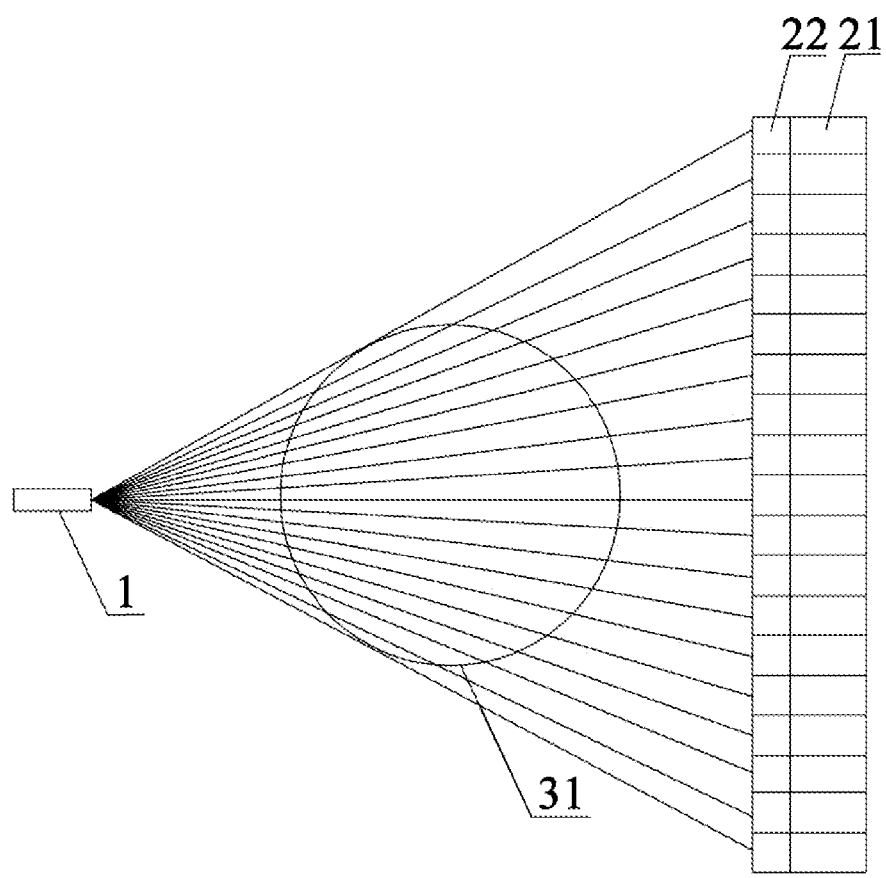
FIG. 2 is a schematic diagram of a path of the gamma rays in Example 1.

As shown in FIG. 2, the gamma-ray source 1 and gamma-ray detector 2 are arranged during mounting, such that the rays emitted from one gamma-ray source 1 can fully cover the cross-section of the throat section 31 of the differential pressure type flowmeter 3, and the gamma rays can fully pass through the multiphase fluid flowing through the cross-section and are received by the gamma-ray detector 2 on the other side of the differential pressure type flowmeter 3, and the total cross-section of the multiphase fluid is detected spatially. The spatial inhomogeneity of the fluid is solved properly to make the measured data more accurate than those measured when only part of the gamma rays passes through the cross-section. In this example, only one radio-active source emits gamma rays, which will not generate interference and make the measured data more accurate.

To receive all the gamma rays passing through the multiphase fluid cross-section, the range of the gamma-ray detector 2 must be large. Therefore, in this example, an array comprising a plurality of semiconductor detectors 21 is adopted. As shown in FIG. 3, the semiconductor detector 21 forms a 4*4 square matrix, and nine 4*4 SIPM square matrices form the entire gamma-ray detector 2. The gamma-ray detector 2 is set to have a receiving range as large as possible, and can receive each ray without omission, making measurement more accurate; the semiconductor detector 21 is arranged in a square matrix to make it easier to calculate the phase fraction.

As shown in FIG. 2, in this example, a scintillation crystal 22 is connected to one end of each semiconductor detector 21 that receives gamma rays.

Scintillation crystals 22, as a material often used in ray detection technology, are capable of converting high-energy gamma rays into low-energy visible light fluorescence, which are then detected by a silicon photomultiplier 21 to convert into electrical signals. At present, commonly used scintillation crystals 22 include sodium (thallium) iodide NaI (Tl), lutetium oxyorthosilicate (LSO), etc. A silicon photomultiplier (SiPM) is a novel detector. After photons are absorbed, a current is generated in the SiPM and multiplied, which can output a larger current signal and can be received by the modular circuit. Its detection efficiency of gamma rays is higher and its volume is smaller.

The scintillation crystal 22 and the semiconductor detector 21 are fixed to each other by a couplant.

The scintillation crystal 22 is a high-density crystal. The surface of the silicon photomultiplier 21 is provided with a layer of epoxy resin. When the light is emitted from the scintillation crystal 22 to the silicon photomultiplier 21, it is emitted from an optically denser medium to an optically thinner medium. If air exists between them, total reflection easily occurs, causing light loss. Optical couplants, especially optical couplers, are transparent media with large refractive index. When couplants are disposed between the scintillation crystal 22 and the silicon photomultiplier 21, the air can be effectively eliminated and the light loss caused by total reflection can be significantly reduced. The couplant may be a silica gel to bond the scintillation crystal 22 to the silicon photomultiplier 21, effectively reducing the loss of light from the scintillation crystal 22 to the silicon photomultiplier 21 and improving the photoelectric conversion efficiency.

In this example, the gamma-ray source 1 is configured to emit gamma rays of at least three energy levels.

A multi-energy radiation source that can naturally emit gamma rays with more than three types of energy is used. Because the ratio of intensity of the naturally emitted gamma rays with three types of energy is inherent and constant that cannot be altered by humans and is not affected by any change in the external temperature and pressure, it brings great convenience and simplification to the solution of the flow formula of the disclosure. For example, using $^{133}$Ba, the gamma rays emitted by the radiation source have three main energy levels, 31 keV, 81 keV, and 356 keV respectively; or using $^{176}$Lu, the gamma rays emitted by the radiation source have at least three energy levels, namely, 307 keV, 202 keV, and 88 keV.

The working principle of the device is as follows. The multiphase fluid flows through the differential pressure type flowmeter 3, and the gamma rays emitted by the gamma-ray source 1 pass through the total cross-section of the multiphase fluid and are received by the gamma-ray detector 2 for photoelectric conversion. After the conversion, the data imaging, analysis and calculation are performed, to obtain the mass phase fraction of the multiphase fluid.

Example 2

Figure 4:
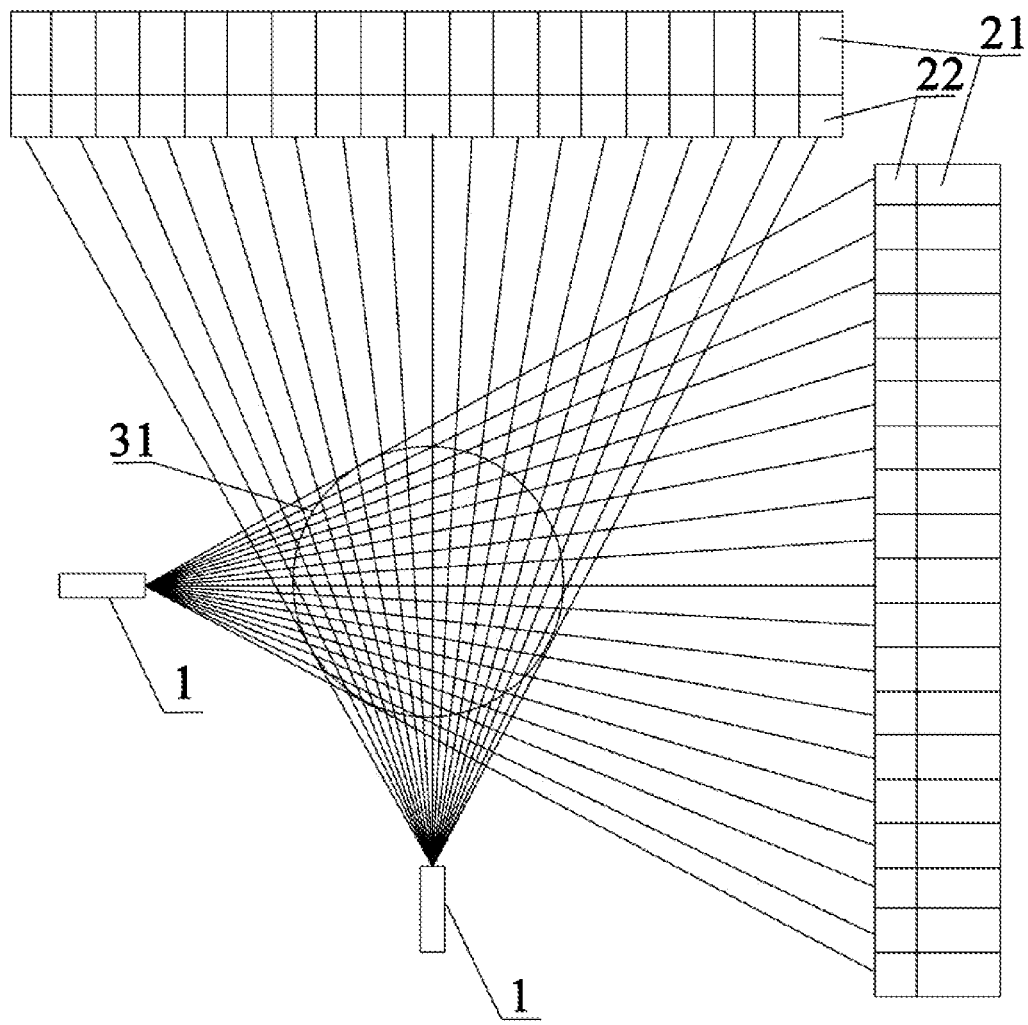
FIG. 4 is a schematic diagram of a path of the gamma rays in Example 2.

As shown in FIG. 4, the difference between this example and Example 1 is that the device in Example 1 comprises only one gamma-ray source 1 and one gamma-ray detector 2. The one gamma-ray source 1 and the one gamma-ray detector 2 are defined as a detection pair. In this example, two detection pairs are disposed around the throat section 31 of the differential pressure type flowmeter 3, and the two detection pairs are arranged along the axis of the differential pressure type flowmeter 3.

Each detection pair can perform total cross-section measurement of the phase fractions of the multiphase fluid, and the data measured by each detection pair can be averaged, to make the measurement result to be more accurate.

In this example, the distance between any two adjacent detection pairs is 10 cm.

Theoretically, the state of the multiphase fluid changes little in a short distance and a short period of time. Therefore, the closer the distance between the two detection pairs, the smaller the state change of the multiphase fluid, and the more accurate the measured data. Since the velocity of the multiphase fluid is generally 10 m/s and the distance is set to 10 cm, the state of the multiphase fluid is almost unchanged within this distance, so that the data measured by each detection pair are considered to be from the same cross-section.

In this example, the two detection pairs can be staggered by 90° from each other, that is, the radiation angle of the gamma-ray source 1 is staggered by 90°. Thus, the multiphase fluid cross-section is measured from different angles, to make the data more accurate.

Example 3

Figure 5:
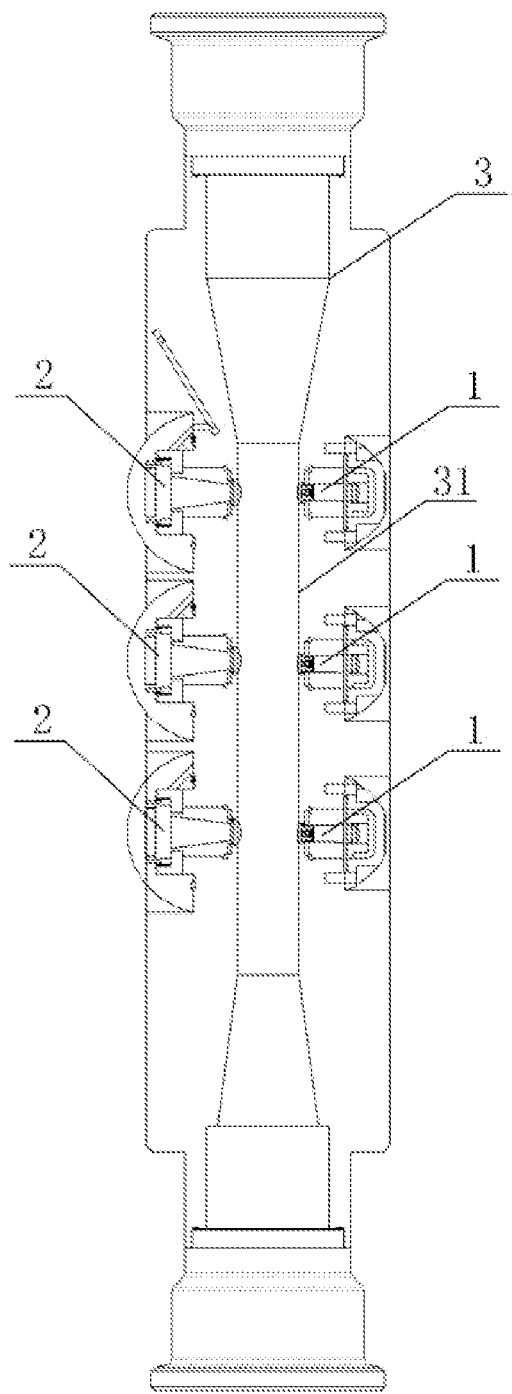
FIG. 5 is a schematic view of a device for total cross-section measurement of a mass flow rate of gas, liquid and solid in a multiphase flow of Example 3.

As shown in FIG. 5, the difference between this example and Example 1 is that the device in Example 1 comprises only one gamma-ray source 1 and one gamma-ray detector 2. The one gamma-ray source 1 and the one gamma-ray detector 2 are defined as a detection pair. In this example, three detection pairs are disposed around the throat section 31 of the differential pressure type flowmeter 3, and the three detection pairs are arranged along the axis of the differential pressure type flowmeter 3.

Each detection pair can perform total cross-section measurement of the phase fractions of the multiphase fluid, and the data measured by each detection pair can be averaged, to make the measurement result to be more accurate.

In this example, the distance between any two adjacent detection pairs is 10 cm.

Theoretically, the state of the multiphase fluid changes little in a short distance and a short period of time. Therefore, the closer the distance between the two detection pairs, the smaller the state change of the multiphase fluid, and the more accurate the measured data. Since the velocity of the multiphase fluid is generally 10 m/s and the distance is set to 10 cm, the state of the multiphase fluid is almost unchanged within this distance, so that the data measured by each detection pair are considered to be from the same cross-section.

Example 4

Figure 6:
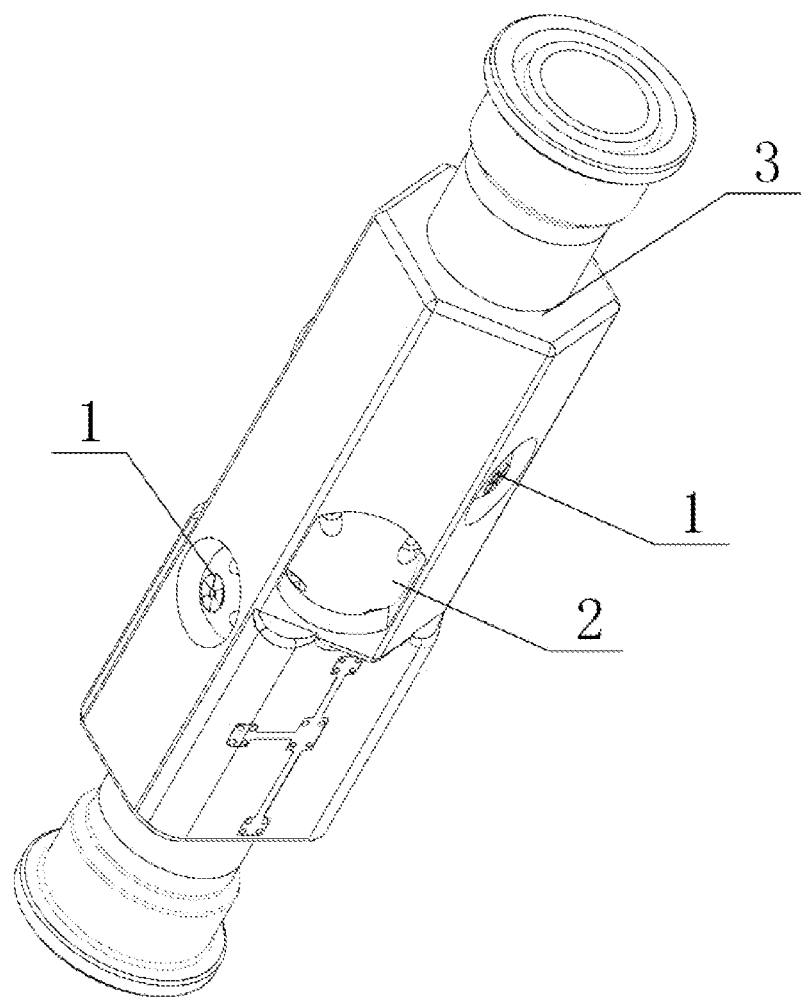
FIG. 6 is a three-dimensional diagram of a device for total cross-section measurement of a mass flow rate of gas, liquid and solid in a multiphase flow of Example 4.
Figure 7:
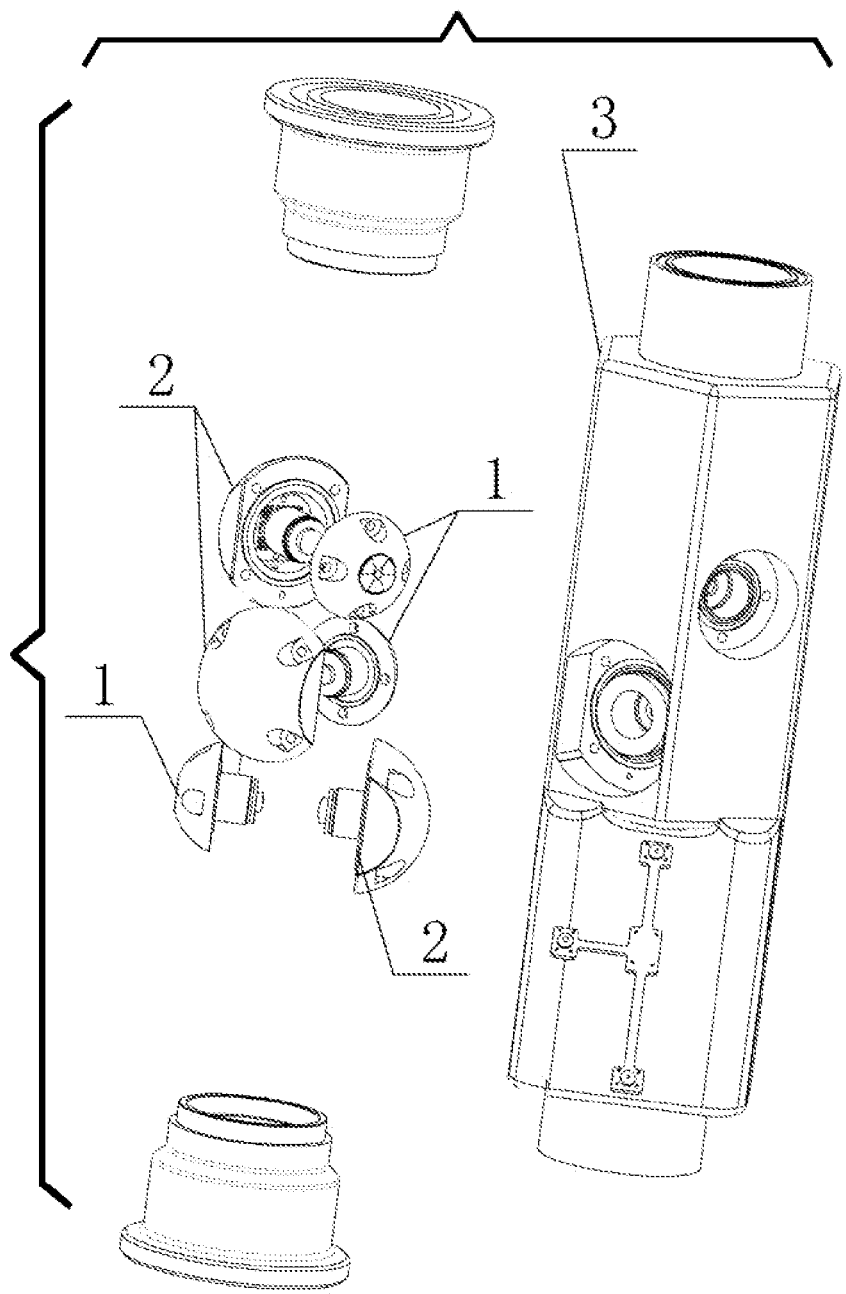
FIG. 7 is an exploded view of a device for total cross-section measurement of a mass flow rate of gas, liquid and solid in a multiphase flow of Example 4.
Figure 8:
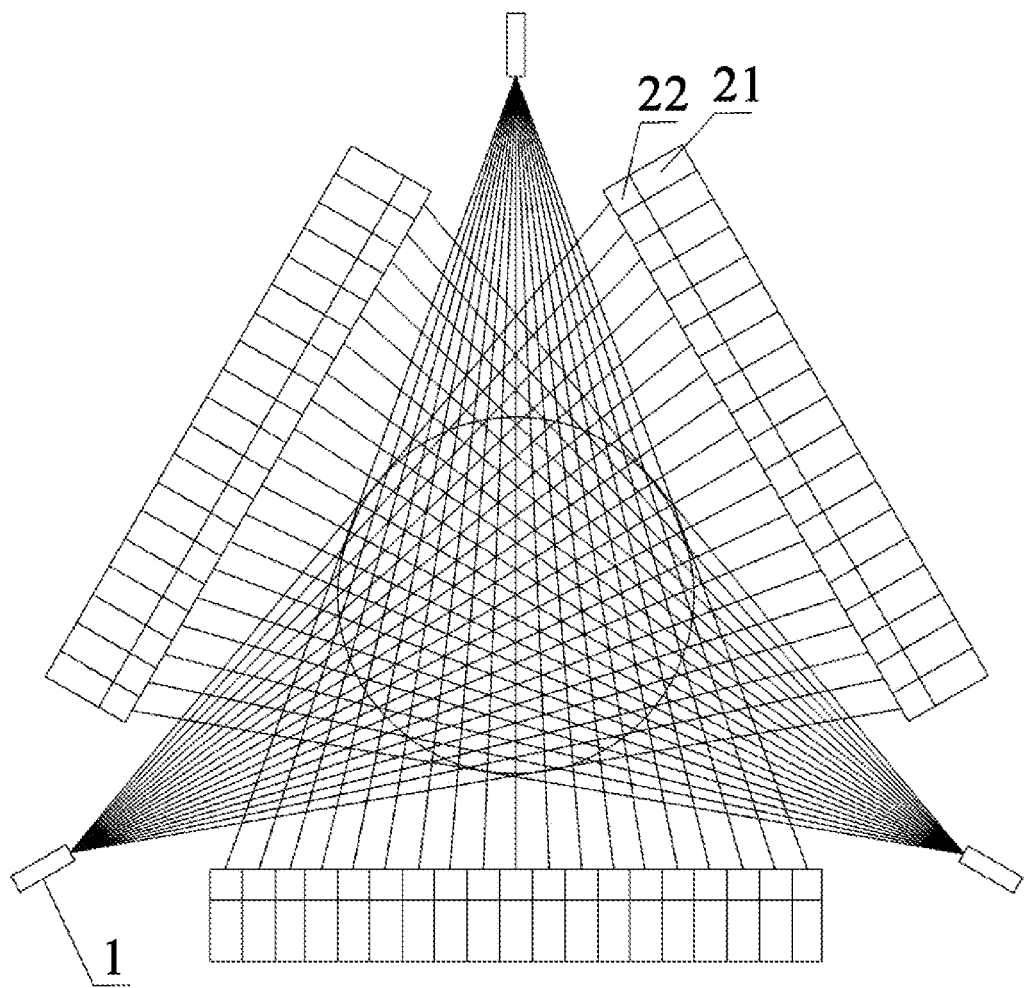
FIG. 8 is a schematic diagram of a path of the gamma rays in Example 4.

As shown in FIG. 6 to FIG. 8, the difference between this example and Example 3 is that the detection pairs are staggered along the axis of the differential pressure type flowmeter 3.

Since both the gamma-ray source 1 and the gamma-ray detector 2 have a certain volume, if all the detection pairs are disposed in the same position and the distance therebetween is too small, they will easily touch each other, and if the distance therebetween is too large, the measurement accuracy will decrease. Therefore, the detection pairs are staggered to make full use of the space for the layout of the gamma-ray source 1 and the gamma-ray detector 2, which can ensure a short distance between the two detection pairs without interfering with each other and occupying space; and after staggering, adjacent gamma-ray sources 1 emit gamma rays in different directions, which will not easily interfere with each other and will improve measurement accuracy.

In addition, in this example, the detection pairs that are staggered from each other can be evenly distributed and disposed around the axis, which is more reasonable in layout and more accurate in detection data.

Example 5

This embodiment is a method for total cross-section measurement of mass flow rate of gas, liquid and solid in a multiphase flow in the above embodiment.

To facilitate the understanding of this disclosure, some terms in the field of multiphase fluid measurement are described as follows.

"Mass flow rate" refers to the mass of fluid flowing in a unit of time. In the SI unit system, its dimension can be kg/s.

"Volume flow rate" refers to the volume of fluid flowing in a unit of time. In the SI unit system, its dimension can be m³/s.

According to the nature of the penetrated fluid, there are three mass flow rates $Q_g$, $Q_l$, $Q_s$, respectively, namely gas mass flow rate, liquid mass flow rate and solid mass flow rate. Based on the mass flow rates of gas, liquid, and solid, the relationship between the total mass flow rate and the diameter of the pipe is as follows:

$$Q_g + Q_l + Q_s = \frac{\pi}{4}\left(\frac{c}{\sqrt{1-\beta^4}}\varepsilon D\right)^2 \Delta P \frac{t}{l}. \tag{8}$$

"Radial direction" refers to the direction along the diameter of the cross-sectional circle of the fluid pipe.

In the following text, the measurement method of multiphase fluid mass flow rate of this embodiment is described in detail.

In this example, a conventional differential pressure type flowmeter 3, such as a Venturi flowmeter is used to measure the pressure difference, and then the total mass flow rate of the multiphase fluid is calculated by the following formula:

$$Q_m = \frac{c}{\sqrt{1-\beta^4}}\varepsilon\frac{\pi}{4}D^2\sqrt{\Delta P \rho_{mix}}; \tag{9}$$

Where, C is the discharge coefficient of the differential pressure type flowmeter, $\varepsilon$ is the multiphase fluid compression correction factor, $\beta$ is the diameter ratio of differential pressure type flowmeter, $\Delta P$ is the pressure difference, $\rho_{mix}$ is the multiphase fluid density (mixed density in terms of the multiphase fluid), and D is the diameter of the fluid pipe.

Next, by using the gamma-ray detector 2 of the multi-energy radiation source, the mass flow rate of each of the three phases (gas, liquid and solid) in the multiphase fluid is measured.

Firstly, based on the gamma ray absorption equations:
The absorption equation of gamma ray 1:

$$\ln\left(\frac{N_{0,1}}{N_{x,1}}\right) = a_{g,1}Q_g + a_{l,1}Q_l + a_{s,1}Q_s; \tag{10}$$

The absorption equation of gamma ray 2:

$$\ln\left(\frac{N_{0,2}}{N_{x,2}}\right) = a_{g,2}Q_g + a_{l,2}Q_l + a_{s,2}Q_s; \tag{11}$$

The absorption equation of gamma ray 3:

$$\ln\left(\frac{N_{0,3}}{N_{x,3}}\right) = a_{g,3}Q_g + a_{l,3}Q_l + a_{s,3}Q_s; \tag{12}$$

Secondly, based on the relationship between the mass flow rate measured by Venturi and the linear mass, and the following equation:

$$Q_g + Q_l + Q_s = \frac{\pi}{4}\left(\frac{c}{\sqrt{1-\beta^4}}\varepsilon D\right)^2 \Delta P \frac{t}{l}; \tag{13}$$

Where, $Q_g$, $Q_l$, $Q_s$ are the respective mass flow rates of the gas, liquid, and solid phases.

According to the characteristics of the radioactive source, there is a proportional relationship among $N_{o,1}$, $N_{o,2}$ and $N_{o,3}$:

$N_{0,2}=f_1 N_{0,1}$, $N_{0,3}=f_2 N_{0,1}$, where, $f_1$ and $f_2$ are the known proportional coefficients, which are naturally constant coefficients and do not change with any measurement conditions. Due to the existence of the proportional coefficients, the three unknown quantities $N_{0,2}$, $N_{0,3}$, $N_{0,1}$ can actually be regarded as only one unknown quantity $N_{0,1}$.

In this way, the four unknown quantities ($N_{0,1}$, $Q_g$, $Q_l$, $Q_s$) can be solved directly and accurately through the four equations (10) to (13) above, thereby eliminating the need for measurement or calibration of $N_{0,1}$. Since it is not required to calibrate $N_{0,1}$ (i.e. the count value of empty pipe), the effect of temperature drift in the gamma ray receiver on the measurement is fundamentally avoided, and there is no need to dispose a constant temperature device in the gamma ray receiver.

In the equation set, $a_{g,1}$, $a_{g,2}$, $a_{g,3}$, $a_{l,1}$, $a_{l,2}$, $a_{l,3}$ and $a_{s,1}$, $a_{s,2}$, $a_{s,3}$ are the linear mass absorption coefficients of gas, liquid, and solid to the gamma ray 1, gamma ray 2 and gamma ray 3 under working conditions, and, $f_1$, $f_2$ are fixed values, which can be obtained by calibration. $N_{x,1}$, $N_{x,2}$, $N_{x,3}$, $\Delta P$ are the measured values, so the mass flow rates ($Q_g$, $Q_l$, $Q_s$) can be solved directly according to the following equations:

$$Q_g = \theta - \frac{(k_2-1)(d_1-d_2)+(k_4-k_2)(d_1-\theta)}{(k_2-1)(k_1-k_3)+(k_4-k_2)(k_1-1)} - \frac{(k_3-1)(d_1-d_2)+(k_3-k_1)(d_1-\theta)}{(k_3-1)(k_2-k_4)+(k_3-k_1)(k_4-1)}; \quad (14)$$

$$Q_l = \frac{(k_2-1)(d_1-d_2)+(k_4-k_2)(d_1-\theta)}{(k_2-1)(k_1-k_3)+(k_4-k_2)(k_1-1)}; \quad (15)$$

$$Q_s = \frac{(k_3-1)(d_1-d_2)+(k_3-k_1)(d_1-\theta)}{(k_3-1)(k_2-k_4)+(k_3-k_1)(k_4-1)}; \quad (16)$$

Then, according to the equation of the mass flow rate calculated by Venturi:

$$Q_t = \frac{C}{\sqrt{1-\beta^4}} \varepsilon \frac{\pi}{4} D^2 \sqrt{\Delta P \rho_{mix}}$$

and the definition of mass phase fraction, the mass flow rates of gas, liquid, and solid phases and the total mass flow rate are calculated according to the following equations:

$Q_{m,g} = Q_m * GMF$ (17);

$Q_{m,l} = Q_m * LMF$ (18);

$Q_{m,s} = Q_m * SMF$ (19);

In the above equations, $$\theta = \frac{\pi}{4} \left( \frac{c}{\sqrt{1-\beta^4}} \varepsilon D \right)^2 \Delta P \frac{t}{l};$$

$$k_1 = \frac{a_{l,1}-a_{l,2}}{a_{g,1}-a_{g,2}};$$

$$k_2 = \frac{a_{s,1}-a_{s,2}}{a_{g,1}-a_{g,2}};$$

$$d_1 = \frac{1}{a_{g,1}-a_{g,2}} \ln\left(\frac{f_1}{N_{x,2}}\right) - \ln(N_{x,1});$$

$$k_3 = \frac{a_{l,1}-a_{l,3}}{a_{g,1}-a_{g,3}};$$

-continued $$k_4 = \frac{a_{s,1}-a_{s,3}}{a_{g,1}-a_{g,3}}$$

$$d_2 = \frac{1}{a_{g,1}-a_{g,3}} \ln\left(\frac{f_2}{N_{x,3}}\right) - \ln(N_{x,1});$$

C: The discharge coefficient of the differential pressure type flowmeter;

$\varepsilon$: The multiphase fluid compression correction factor;

$\beta$: The diameter ratio of differential pressure type flowmeter;

D: The thickness measured by gamma rays, namely, the diameter of the fluid pipe;

$\Delta P$: The pressure difference;

$\rho_{mix}$: The average density of the measured fluid;

$$\rho_{mix} = (Q_g + Q_l + Q_s)/S\frac{t}{l};$$

S is the area of the measured cross section, $$S = \frac{\pi}{4}D^2,$$

is the unit length, t is the unit time;

Gas mass fraction, $$GMF = \frac{Q_g}{Q_g + Q_l + Q_s};$$

Liquid mass fraction, $$LMF = \frac{Q_l}{Q_g + Q_l + Q_s};$$

Solid mass fraction, $$SMF = \frac{Q_s}{Q_g + Q_l + Q_s};$$

$Q_g$, $Q_l$, $Q_s$ are the mass flow rates of gas, liquid and solid to be solved respectively;

$\alpha$ is the mass absorption coefficient of the multiphase fluid for gamma rays, Q is the mass flow rate of the multiphase fluid to be measured, the subscripts 1, 2 and 3 respectively represent gamma rays of different energy levels;

Since the path of each gamma ray passing through the multiphase fluid is different, the calculation of the phase fractions will also be different. Finally, all calculation results are weighted and averaged to obtain the final and accurate linear mass value of each phase according to the following formulas:

$Q_g = \Sigma(Xi/D * Q_{gi})/\Sigma(Xi/D)$ $Q_l = \Sigma(Xi/D * Q_{li})/\Sigma(Xi/D)$ $Q_s = \Sigma(Xi/D * Q_{si})/\Sigma(Xi/D)$ $Q_g$, $Q_l$, $Q_s$ are the final linear masses of gas, liquid and solid to be solved. D is the diameter of the throat section (31)

of the differential pressure type flowmeter (3), X is the distance passed by each gamma ray in the throat section (31), $Q_{gi}$, $Q_{li}$, $Q_{si}$ are the linear mass values measured after each gamma ray passes through the throat section (31); conduct statistics on all gamma rays and their linear mass data of each phase according to the formula, to calculate the final accurate values.

The measurement device and measurement method described in this example are described for measuring and calculating the mass flow rates of three phases (gas, liquid, and solid) in a multiphase fluid. The device and method are also applicable to the measurement of two-phase flow and the calculation of the respective mass flow rates of the gas phase and the liquid phase. Accordingly, the principle and method of calculating the mass flow rates according to the two energy levels of the gamma-ray radiation sources can be analogized based on the above content.

It will be obvious to those skilled in the art that changes and modifications may be made, and therefore, the aim in the appended claims is to cover all such changes and modifications.

What is claimed is:

1. A method for total cross-section measurement of mass flow rates of gas, liquid and solid phases in a multiphase flow using a device; wherein:
   the device comprises a gamma-ray source and a gamma-ray detector that form a detection pair, and a differential pressure type flowmeter; wherein:
      the differential pressure type flowmeter comprises a throat section having a cross section;
      the gamma-ray source and the gamma-ray detector are respectively disposed at opposite positions on two opposite sides of the throat section;
   the gamma-ray detector is in the form of an array comprising a plurality of detection units, and the gamma-ray source is configured to emit gamma rays that have a full coverage of the cross section of the throat section, and the gamma-ray detector is configured to receive the gamma rays passing through the cross section of the throat section;
   the differential pressure type flowmeter is configured to measure a total mass flow rate of a multiphase flow;
   the detection pair is configured to measure mass phase fractions of the multiphase flow in a full coverage of the cross section; and
   the gamma-ray source is adapted to use a single radiation source to emit gamma rays;
   the method comprises:
      a) measuring a temperature T of the multiphase flow by a temperature sensor, measuring a pressure difference ΔP between an inlet of the differential pressure type flowmeter and the throat section; and
      measuring transmission intensities $N_{x1}$, $N_{x2}$, $N_{x3}$ of three gamma rays by the gamma-ray detector;
      b) calculating a total mass flow rate of the multiphase flow and respective mass flow rates of gas, liquid and solid phases of the multiphase flow according to the following formula:
      total mass flow rate:

$$Q_m = \frac{C}{\sqrt{1-\beta^4}} \varepsilon \frac{\pi}{4} D^2 \sqrt{\Delta P \rho_{mix}};$$

$Q_{m,g} = Q_m * GMF$;   gas mass flow rate:

$Q_{m,l} = Q_m * LMF$;   liquid mass flow rate:

$Q_{m,s} = Q_m * SMF$;   solid mass flow rate:

where,
gas mass fraction, $$GMF = \frac{Q_g}{Q_g + Q_l + Q_s};$$

liquid mass fraction, $$LMF = \frac{Q_l}{Q_g + Q_l + Q_s};$$

solid mass fraction, $$SMF = \frac{Q_s}{Q_g + Q_l + Q_s};$$

where, $Q_g$, $Q_l$, $Q_s$ are respectively linear masses of the gas, liquid, and solid phases, and $$Q_g = \theta - \frac{(k_2-1)(d_1-d_2)+(k_4-k_2)(d_1-\theta)}{(k_2-1)(k_1-k_3)+(k_4-k_2)(k_1-1)} - \frac{(k_3-1)(d_1-d_2)+(k_3-k_1)(d_1-\theta)}{(k_3-1)(k_2-k_4)+(k_3-k_1)(k_4-1)};$$

$$Q_l = \frac{(k_2-1)(d_1-d_2)+(k_4-k_2)(d_1-\theta)}{(k_2-1)(k_1-k_3)+(k_4-k_2)(k_1-1)};$$

$$Q_s = \frac{(k_3-1)(d_1-d_2)+(k_3-k_1)(d_1-\theta)}{(k_3-1)(k_2-k_4)+(k_3-k_1)(k_4-1)};$$

where, $$\theta = \frac{\pi}{4}\left(\frac{c}{\sqrt{1-\beta^4}}\varepsilon D\right)^2 \Delta P \frac{t}{l};$$

$$k_1 = \frac{a_{l,1}-a_{l,2}}{a_{g,1}-a_{g,2}};$$

$$k_2 = \frac{a_{s,1}-a_{s,2}}{a_{g,1}-a_{g,2}};$$

$$d_1 = \frac{1}{a_{g,1}-a_{g,2}}\ln\left(\frac{f_1}{N_{x,2}}\right) - \ln(N_{x,1});$$

$$k_3 = \frac{a_{l,1}-a_{l,3}}{a_{g,1}-a_{g,3}};$$

$$k_4 = \frac{a_{s,1}-a_{s,3}}{a_{g,1}-a_{g,3}};$$

$$d_2 = \frac{1}{a_{g,1}-a_{g,3}}\ln\left(\frac{f_2}{N_{x,3}}\right) - \ln(N_{x,1});$$

letters in each formula are defined as follows:
C: a discharge coefficient of a differential pressure type flowmeter;
ε: a compression correction factor of the multiphase flow;
β: a diameter ratio of the differential pressure type flowmeter;
D: a thickness measured by gamma rays, also a diameter of a fluid pipe;
ΔP: the pressure difference;
f1, f2: initial intensity ratios of a second gamma ray and a third gamma ray to a first gamma ray;

ρmix: an average density of the measured flow;

$$\rho_{mix} = (Q_g + Q_l + Q_s)/S\frac{t}{l};$$

S is an area of the measured cross-section;

$$S = \frac{\pi}{4}D^2,$$

l is a unit length, t is a unit time;
α is a mass absorption coefficient of the multiphase flow for gamma rays, Q is the mass flow rate of the multiphase flow to be measured, subscripts 1, 2 and 3 respectively represent gamma rays of different energy levels;
all calculation results are weighted and averaged to obtain a final and accurate linear mass value of each phase according to the following formulas:

$Q_g = \Sigma(Xi/D * Q_{gi})/\Sigma(Xi/D);$ $Q_l = \Sigma(Xi/D * Q_{li})/\Sigma(Xi/D);$ $Q_s = \Sigma(Xi/D * Q_{si})/\Sigma(Xi/D);$ $Q_g$, $Q_l$, $Q_s$ are final linear masses of gas, liquid and solid phases of the multiphase flow; D is a diameter of the throat section of the differential pressure type flowmeter, X is a distance passed by each gamma ray in the throat section, $Q_{gi}$, $Q_{li}$, $Q_{si}$ are linear mass values measured after each gamma ray passes through the throat section.

2. The method of claim 1, wherein the gamma-ray source is configured to emit gamma rays of at least three energy levels.

3. The method of claim 1, wherein when a plurality of detection pairs is disposed along the axial direction of the differential pressure type flowmeter, a distance between every two adjacent detection pairs is 1 to 10 cm.

4. The method of claim 3, wherein the plurality of detection pairs is staggered with each other along a circumferential direction of the differential pressure type flowmeter and distributed around the axial direction; the gamma-ray sources of the plurality of detection pairs are staggered with each other along the circumferential direction.

5. The method of claim 1, wherein a scintillation crystal is connected to one end of each detection unit of the plurality of detection units that is adapted for receiving the gamma rays, and the each detection unit is a silicon photomultiplier (SiPM).

6. The method of claim 5, wherein the scintillation crystal and the each detection unit are fixed to each other by a couplant.

7. The method of claim 1, further comprising a temperature and pressure sensor for measuring a temperature and pressure of the multiphase flow, and a differential pressure sensor for measuring a pressure difference between an inlet of the differential pressure type flowmeter and the throat section.

\* \* \* \* \*